United States Patent [19]

Ogasawara

[11] 4,296,441
[45] Oct. 20, 1981

[54] PHOTOELECTRIC SCANNING APPARATUS
[75] Inventor: Fumihiro Ogasawara, Tokyo, Japan
[73] Assignee: Ricoh Company, Ltd., Tokyo, Japan
[21] Appl. No.: 99,787
[22] Filed: Dec. 3, 1979
[30] Foreign Application Priority Data
  Dec. 14, 1978 [JP] Japan .................. 53-153753
[51] Int. Cl.³ ............................................. H04N 1/10
[52] U.S. Cl. ............................... 358/293; 358/264; 358/285; 250/578
[58] Field of Search ............... 358/293, 256, 264, 288, 358/199, 204; 250/578, 234; 350/288
[56] References Cited
U.S. PATENT DOCUMENTS

| 2,953,638 | 9/1960 | Wintringham | 358/285 |
| 3,142,761 | 7/1964 | Rabinow | 358/285 |
| 4,199,784 | 4/1980 | Wellendorf | 358/293 |
| 4,203,136 | 5/1980 | Wellendorf et al. | 358/293 |

FOREIGN PATENT DOCUMENTS

1534529  12/1978  United Kingdom ............... 358/285

Primary Examiner—Joseph A. Orsino, Jr.
Assistant Examiner—Edward L. Coles
Attorney, Agent, or Firm—David G. Alexander

[57] ABSTRACT

A charge accumulation type photosensor array (21) is reciprocated perpendicular to the direction of a row of photosensor elements of the array (21) to scan an original document (22). A timing pulse generator (48) produces timing pulses (E) corresponding to incremental movements of the array (21). All of the photosensor elements produce data signals (Vid) at outputs thereof in series in response to each timing pulse (E). An enable signal (L) is produced when the array (21) is moving in an effective scan area in which the array (21) is moving at constant speed and the periods of the timing pulses (E) are constant. Binary data signals (D) are stored in a memory (44) only while the enable signal (L) is being produced. The charge accumulation times of the photosensor elements in the effective scan area are constant, and especially the charge accumulation time in the first increment of movement in the effective scan area is the same as in the succeeding increments.

4 Claims, 11 Drawing Figures

PHOTOELECTRIC SCANNING APPARATUS

BACKGROUND OF THE INVENTION

The present invention relates to a photoelectric scanning apparatus for a facsimile system or the like comprising a charge accumulation type photosensor array such as a charge coupled device (CCD) array or a photo diode array (PDA).

In a device of the present type, which is disclosed in detail in copending U.S. patent application Ser. No. 967,834, filed Dec. 8, 1978 entitled "FACSIMILE TRANSCEIVER UTILIZING ORTHOGONAL CONVERSION" which is assigned to the same assignee as this application, a CCD photosensor array or a PDA is reciprocated relative to an original document for scanning the same. The direction of movement is perpendicular to the row of photosensor elements which make up the array. A timing pulse generator produces timing signals in response to each incremental movement of the array. Each time a timing signal is produced, all of the photosensor elements produce data signals at their outputs in a serial manner. The magnitude of each data signal corresponds to the intensity of incident light from the document.

Since a CCD array produces the data signals which depend not only incident light but also on the charge accumulation time (the time intensity is integrated with respect to time), the output of the array depends on the period of the timing pulses. At the beginning of each stroke of the reciprocating movement the array is accelerated and the periods of the timing pulses progressively decrease. The opposite occurs at the end of each stroke. For this reason, the array produces data signals whose magnitudes are maximum at the ends of the strokes and minimum in the middles.

For this reason, a servo motor or the like which drives the array is designed to accelerate to a predetermined speed in a minimum distance and thereafter move the array at constant speed. At the end of the stroke, the motor decelerates the array in a minimum distance to a stop. The object of this design is to provide a constant speed area which occupies the maximum possible range of the movement of the array. In the constant speed area, the periods of the timing pulses are constant and therefore the data signals produced by the array vary only proportion to the intensity of incident light.

It has been proposed in the prior art to generate a data enable signal while the array is moving in the constant speed area and furthermore give the constant speed area a predetermined length such as corresponding to 1728 timing pulses. Where the array has 64 elements, a total of 1728×64=110,592 data signals will be produced during each scan stroke of the array. A gate is provided so that the timing pulses will be applied to the array only while the enable signal is produced and thereby the array can only produce the data signals in the effective area. However, a problem has been heretofore unsolved in that the first 64 data signals have maximum magnitude corresponding to a saturated condition of the photosensor elements. This is because charge accumulation has occured in the array from the beginning of the stroke to the beginning of the effective area. This results in a perfectly white line constituting the first incremental area of the scan.

A prior art proposal to overcome this problem involves extending the effective area to 1729 increments and ignoring the first 64 data signals. However, this requires complicated counter and gating circuitry which adds unnecessarily to the cost of the apparatus.

SUMMARY OF THE INVENTION

A photoelectric scanning apparatus embodying the present invention includes a charge accumulation type photosensor array having a plurality of photosensor elements arranged in a row, the array being reciprocated for scanning perpendicular to the row, and is characterized by comprising pulse generator means for producing timing pulses in response to incremental movements of the array, the array producing data signals from outputs of all of the elements in series in response to each timing pulse, sensor means for producing an enable signal when the array is within an effective scan area in which periods of the timing pulses are constant, and gate means for enabling transmission of the data signals only in response to the enable signal.

In accordance with the present invention, a charge accumulation type photosensor array is reciprocated perpendicular to the direction of a row of photosensor elements of the array to scan an original document. A timing pulse generator produces timing pulses corresponding to incremental movements of the array. All of the photosensor elements produce data signals at outputs thereof in series in response to each timing pulse. An enable signal is produced when the array is moving in an effective scan area in which the array is moving at constant speed and the periods of the timing pulses are constant. The data singles are stored in a memory only while the enable signal is being produced. The charge accumlation times of the photosensor elements in the effective scan area are constant, and especially the charge accumulation time in the first increment of movement in the effective scan area is the same as in the succeeding increments.

It is an object of the present invention to provide a photoelectric scanning apparatus comprising a charge accumlation type photosensor array which enables undistorted scanning with simplified circuitry.

It is another object of the present invention to provide a photoelectric scanning apparatus which is reliable in operation and is economical to manufacture on a commercial production basis using conventional components.

It is another object of the present invention to provide a generally improved photoelectric scanning apparatus.

Other objects, together with the foregoing, are attained in the embodiments described in the following description and illustrated in the accompanying drawing.

DESCRIPTION OF THE PREFERRED EMBODIMENTS

While the photoelectric scanning apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
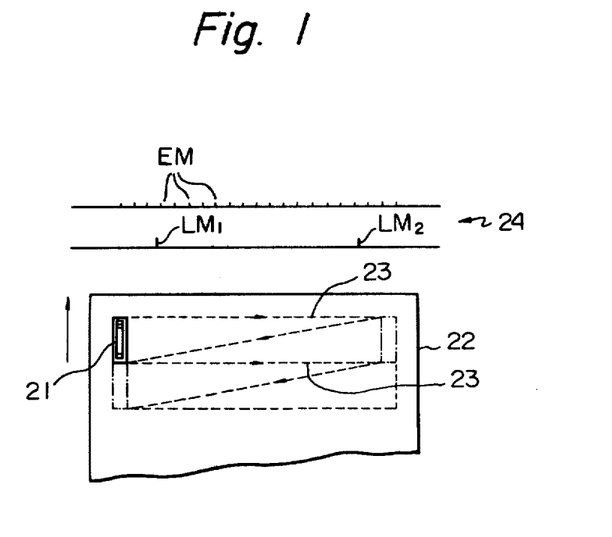
FIG. 1 is a diagram illustrating the path of movement of a photosensor array relative to an original document.

Referring now to FIG. 1 of the drawing, a photosensor array of the charge accumulation type, preferably a charge coupled device (CCD) or a photo diode array (PDA), is designated by the reference numeral 21 and is arranged so that a row of photosensor elements (not individually designated) extends in the vertical direction. The array 21 is reciprocated from left to right in a scan stroke and from right to left in a return stroke relative to an original document 22. At the end of each scan stroke, the document is moved upwardly by a distance equal to the length of the array 21 (in the vertical direction) so that a path is traced by the array 21 on the document 22 as indicated by a broken line path 23. The array 21 produces data signals corresponding to incident light from the document 22. The array may be so designed that the scan stroke is performed in both directions, that is, not only from left to right but also from right to left relative to the document, for example, as disclosed in British Pat. No. 1,541,313 (See FIG. 7). In such a case, it will be seen that the path traced by the array on the document is different from the path 23.

A timing signal generator means produces timing signals E and LS. Although the generator means is not illustrated in detail in FIG. 1 since it is clearly disclosed in the above-mentioned copending U.S. patent application Ser. No. 967,834, it is symbolically represented at 24 as comprising a fix clock plate. The plate 24 has two rows of marks, an upper row with marks EM at fixed spacing and a lower row with two marks, LM1 and LM2. Photosensors (not shown) move together with the array 21 and produce timing signals E and area end signals LS in response to sensing the marks EM and LM1 and LM2 respectively. The marks EM are spaced from each other by a distance substantially equal to the width of each photosensor element in the array 21, and there are 1728 marks EM between the marks LM1 and LM2. The number of the marks EM is, of course, not to be limited to 1728 only and, for example, there may be provided with 2048 marks EM in case of a B4 size document. Further, as disclosed in U.S. Pat. No. 3,970,183 which is assigned to Centronis Data Computer Corp., though there are provided with 864 marks EM (i.e., equal to 1728/2), the photosensors may electrically sense 1728 marks EM.

Figure 2:
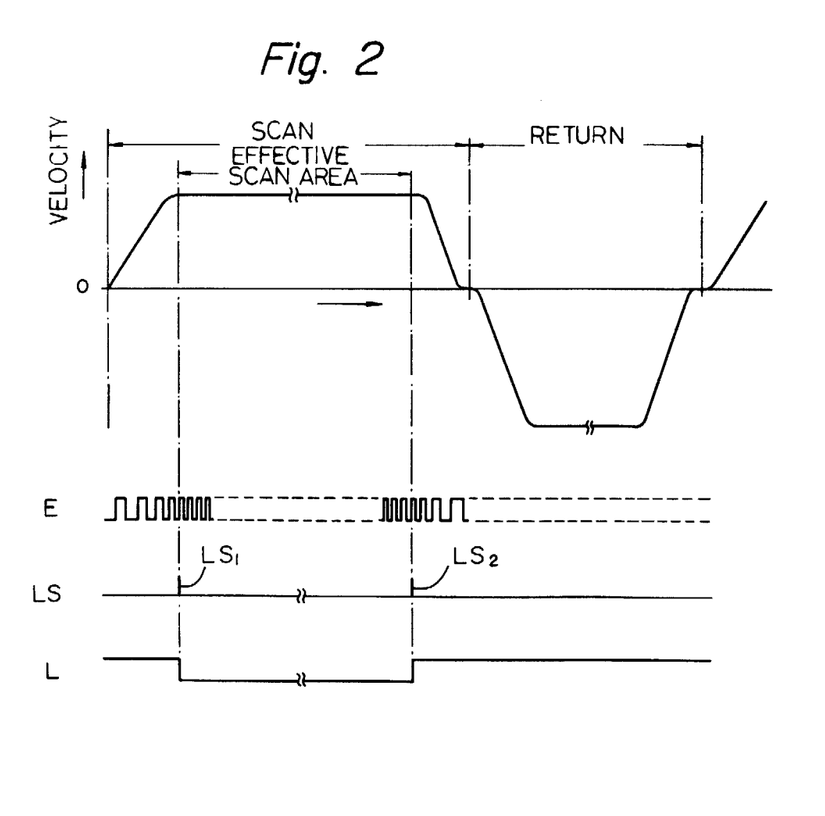
FIG. 2 is a graph illustrating the velocity of movement of the array and the generation of timing signal.

Referring also to FIG. 2, it will be seen that the array 21 decelerates to zero velocity at the ends of the strokes and moves at constant speed in an effective scan area between the marks LM1 and LM2. Thus, the timing signals E have constant periods in the effective scan area and the charge accumulation or integration time of the elements of the array 21 is constant in this area. FIG. 2 shows how the periods of the signals E and maximum at the ends of the strokes but are constant at a minimum value in the effective scan area.

As will become clear from further description, a scan start signal S is produced in accordance with the prior art at the trailing edge of each timing pulse or signal E in the effective scan area. This is made possible because an enable signal L is produced which is logically low between the signals LS1 and LS2 and enables the scan start signals S to be gated to the array 21 only when low. In response to each scan start signal S, the elements of the array 21 produce data signals at their outputs which are fed out of the array 21 in a serial manner in synchronism with clock pulses P. There are 64 clock pulses produced between successive scan start signals S so that the output signals of each of the 64 elements of the array 21 are shifted out. The array 21 is moved at constant speed so that incident light is integrated by means of charge accumulation during the times that previously accumulated charges constituting the data signals are shifted out of an analog shift register (not shown) of the array 21 in a known manner.

In this manner, 64 data signals are produced constituting a vertical scan line in response to each timing signal E or equivalently each scan start signal S. Upon movement of the array 21 by another increment corresponding to a timing signal E, another vertical scan line of 64 data signals is produced. In this manner, during each scan stroke, an area of the document 22 equal to the length (vertical) of the array 21 times the length (horizontal) of the effective scan area is scanned to produce 110,592 data signals representing corresponding points on the document 22.

Figure 3:
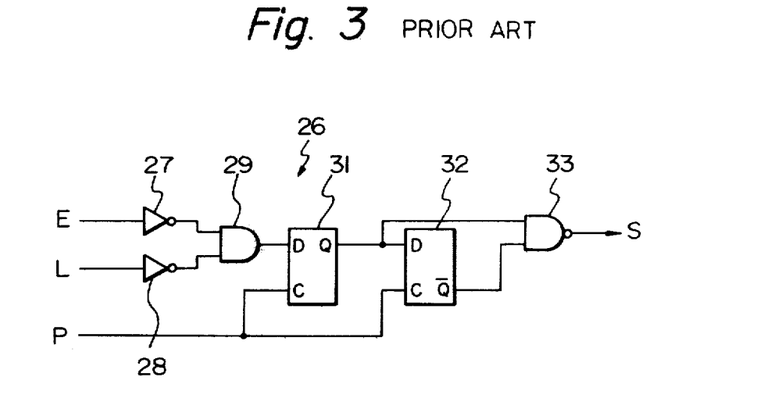
FIG. 3 is an electrical schematic diagram of a prior art scan start signal generator.

A prior art scan start signal generator for generating the scan start pulses S is shown in FIG. 3 and designated as 26. The signals E and L are applied to inputs of an AND gate 29 through inverters 27 and 28 respectively. The output of the AND gate 29 is connected to the D input of a flip-flop 31. The Q output of the flip-flop 31 is connected to the D input of a flip-flop 32 and also to an input of a NAND gate 33. The $\bar{Q}$ output of the flip-flop 32 is connected to another input of the NAND gate 33. The clock pulses P are fed to clock inputs of the flip-flops 31 and 32. The scan start pulses S appear at the output of the NAND gate 33.

The AND gate 29 is enabled only while the enable signal L is low. The inverted version of the timing pulses E appears at the output of the AND gate 29.

The Q output of the flip-flop 31 generally follows the output of the AND gate 29 due to the high frequency of the clock pulses P, so that the inversions of the timing signals E appear at the D input of the flop-flop 32 and also at one input of the NAND gate 33. The Q output of the flip-flop 32 generally follows the Q output of the flip-flop 31 due to the high frequency of the clock pulses P. However, there are brief times when the Q output of flip-flop 31 and the $\bar{Q}$ output of the flip-flop 32 will both be high, satisfying the requirements for a low output from the NAND gate 33. This occurs at the leading edges of the inversions of the timing pulses E (or at the trailing edges of the timing pulses E themselves). Just prior to these times, the Q output of the flip-flop 31 will be low and the $\bar{Q}$ output of the flip-flop 32 will be high, since both flip-flops 31 and 32 are in the logically low state. When the inversion of the timing signal E goes high, the flip-flop 31 will be changed at the logically high state by the next clock pulse P. At this time, the Q output of the flip-flop 31 is high and the $\overline{Q}$ output of the flip-flop 32 is also high since the flip-flop 32 is still in the logically low state. The high Q output of the flip-flop 31 will cause the flip-flop 32 to change to the high state in response to the next clock pulse P. Thus, the scan start pulses S are generated having a pulse width equal to the period of one clock pulse P.

Figure 4:
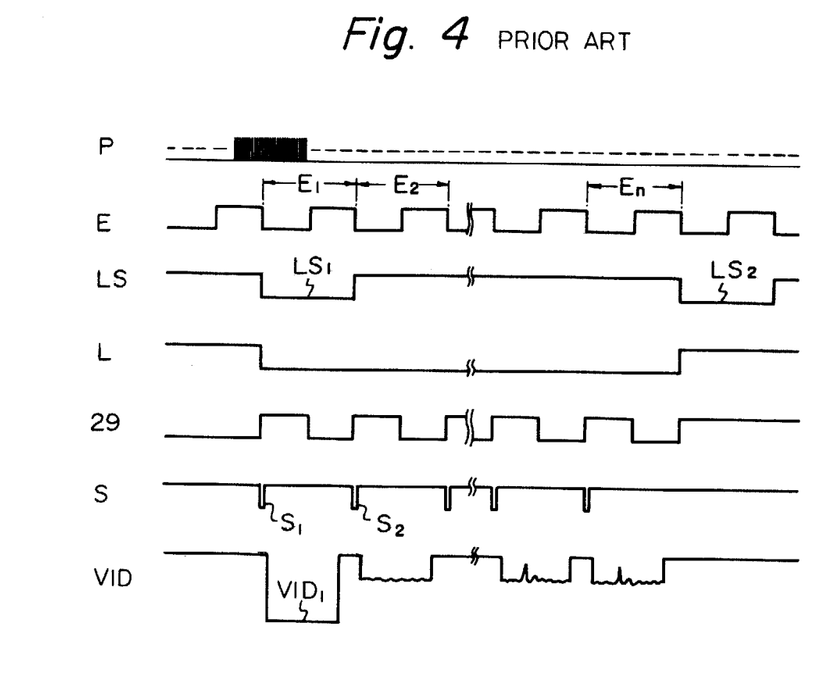
FIG. 4 is a timing diagram illustrating the operation of the scan start signal generator.

FIG. 4 illustrates the drawback of the prior art in which the analog data signals produced by the array 21 are designated as Vid. In accordance with the operation of the scan start signal generator 26, the first scan start signal S1 will be applied to the array 21 at the beginning of the effective scan area at which time the enable signal L goes low. This is because the AND gate 29 is inhibited when the enable signal L is high and the output of the NAND gate 33 will remain high. Thus, the array 21 accumulates charge from the left end of the scan stroke to the left end of the effective scan area and saturates as indicated at Vid1 in FIG. 4. Thus, the first vertical scan line is perfectly white and the scan image is thereby distorted. The prior art means for overcoming this problem by ignoring the first 64 data signals has been described hereinabove.

Figure 5:
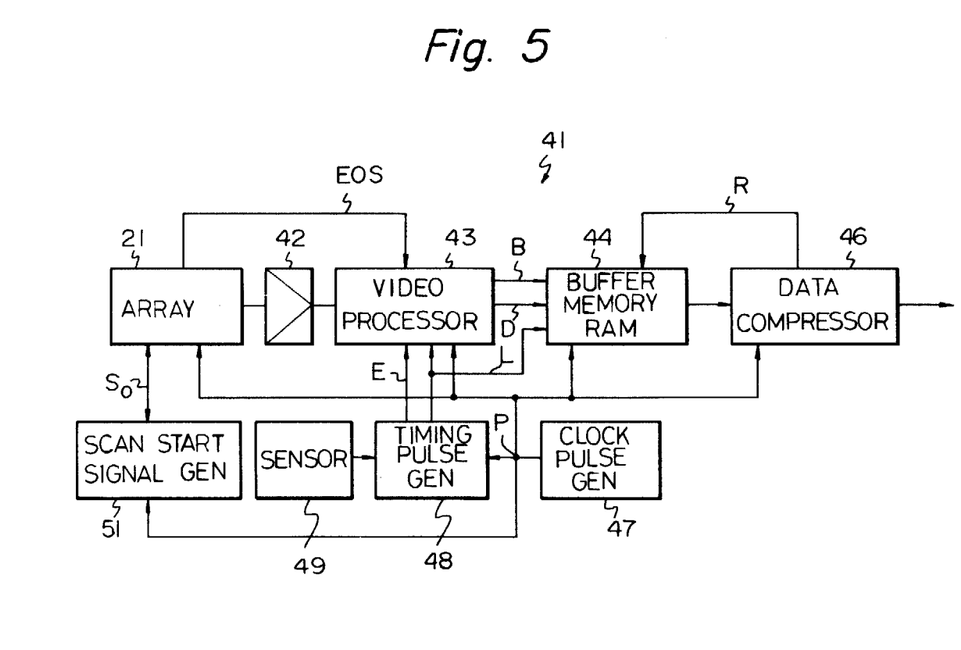
FIG. 5 is a block diagram of a photoelectric scanning apparatus embodying the present invention.

A photoelectric scanning apparatus embodying the present invention is illustrated in FIG. 5 and generally designated by the reference numeral 41. The apparatus 41 comprises the array 21 which has its output connected through an amplifier 42 to a video processor 43 which converts the analog data signals Vid into binary form as designated as D and also blanking pulses B which are logically high during the times the array 21 is not shifting out the signals Vid. The signals D from the processor 43 are stored in a buffer memory 44. The memory 44 is of the read-write type such as a random access memory (RAM). The memory 44 has a capacity of 64×1728 bits. The detailed construction and operation of the memory 44 are described in the above-mentioned copending U.S. patent application Ser. No. 967,834.

After each scanning operation is completed and during the return stroke of the array 21, a data compressor 46 reads the data signals D out of the memory 44 and compresses them for transmission. Any known compression method such as run length encoding may be employed as known in the art of facsimile transmission. The compressed data signals are fed through a modem to a remote unit (not shown) for expansion and reproduction of the document 22.

The apparatus 41 comprises a clock pulse generator 47 for producing the clock pulses P which are fed to the array 21, processor 43, memory 44, compressor 46 and a timing pulse generator 48. A sensor 49 senses the marks on the clock plate 24 in the manner described hereinabove and feeds signals to the timing pulse generator 48 which produces the timing pulses E and the enable signal L in response thereto. The timing pulses E are fed to the processor 43 and also to a scan start signal generator 51. The enable signal L is fed to the processor 43 and memory 44.

Figure 6:
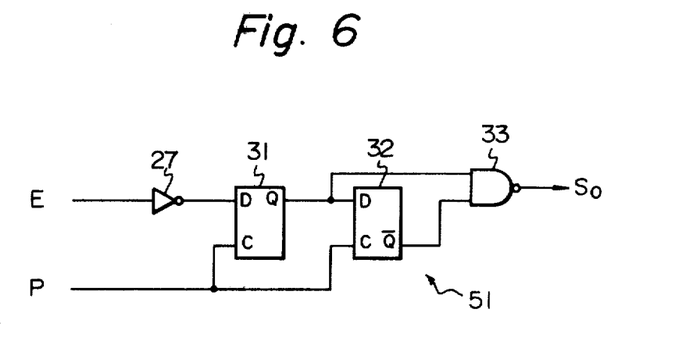
FIG. 6 is an electric schematic diagram of an improved scan start signal generator embodying the present invention.
Figure 7:
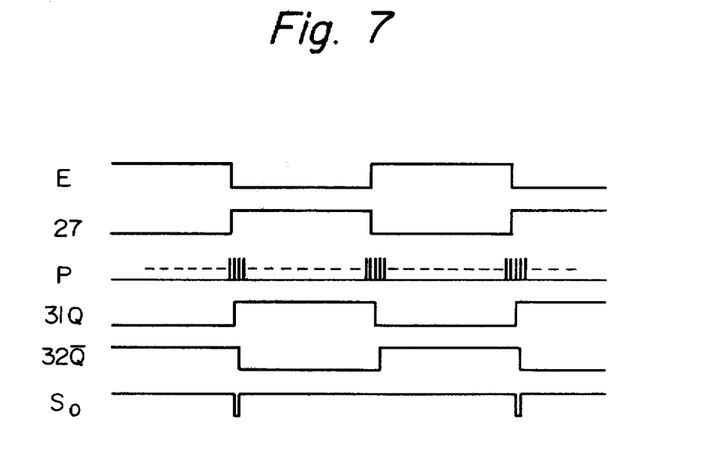
FIG. 7 is a timing diagram illustrating the operation of the present scan start signal generator.

The generator 51 is shown in FIG. 6 and is similar to the prior art generator 26 except that the inverter 28 and AND gate 29 are omitted. Like elements are designated by the same reference numerals. The generator 51 operates in the same manner as the generator 26 except that scan start signals So are produced in response to each timing pulse E regardless of whether the array 21 is inside or outside the effective scan area. The array 21 feeds out the 64 data signals Vid in response to the scan start signal So and feeds an end of scan signal EOS to the processor 43 when all 64 signals Vid have been fed out. The operation of the generator 51 is illustrated in FIG. 7.

Figure 8:
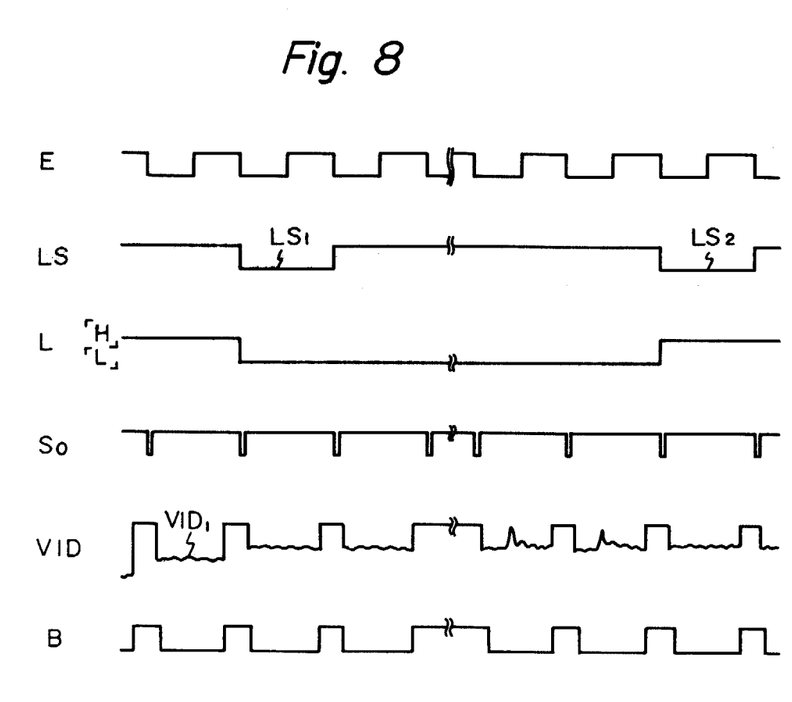
FIG. 8 is a timing diagram illustrating the operation of the present photoelectric scanning apparatus.

The advantage of the present invention is shown in FIG. 8. It will be understood that the array 21 is operated in a continuous manner and produces data signals regardless of the position of the array 21. The array 21 will be accelerated up to constant speed at the beginning of the effective scan area at which the signal LS1 is produced. Thus, the data signals Vid1 produced during the first vertical scan in the effective scan area will not be distorted. This is because the charge accumulation or integration time for the first vertical scan in the effective scan area is the same as in the successive vertical scans, contrary to the prior art in which first vertical scan corresponds to a saturated condition of the array 21.

The enable signal L is applied to the video processor 43 and memory 44 to enable the same only when the signal L is low, which occurs only in the effective scan area. When the signal L is high, the video processor 43 blocks the signals D to prevent them from reaching the memory 44. In addition, the high signal L inhibits application of the clock pulses P to a memory incrementation input of the memory 44 so that the operation of addressing successively higher numbered memory locations in the memory 44 for storing data signals is inhibited. It will be understood that the problems of the prior art are overcome using simplified electronic circuitry. Data is read out of the memory 44 and fed to the compressor 46 under control of a ready signal R from the compressor 46.

Figure 9:
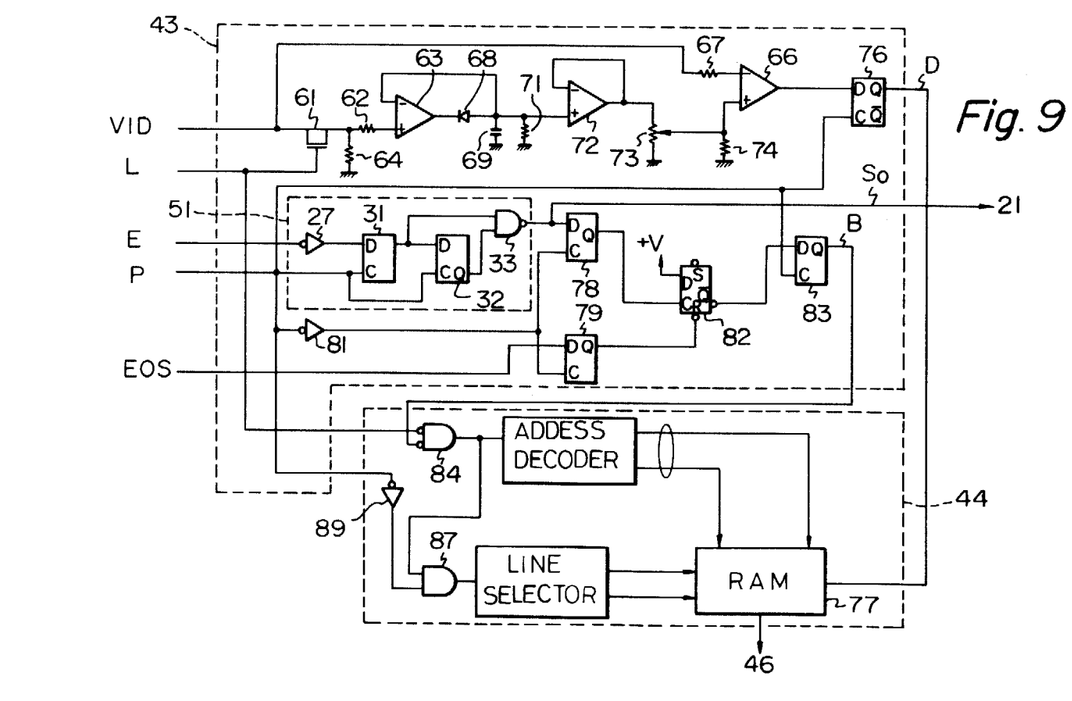
FIG. 9 is a more detailed diagram of parts of the present photoelectric scanning apparatus.

The video processor 43 and memory 44 are shown in greater detail in FIG. 9. The compressor 43 comprises a field effect transistor (FET) 61 through which the data signals Vid are applied in series with a resistor 62 to the non-inverting input of an operational amplifier 63. A resistor 64 is connected between the junction of the FET 61 and resistor 62 and ground. The enable signal L is applied to the gate of the FET 61 to turn the same on when the signal L is low. Thus, the video signals Vid are fed to the amplifier 63 only when the signal L is low.

The signals Vid are also applied to the inverting input of an operational amplifier 66 through a resistor 67. The output of the amplifier 63 is connected to the cathode of a diode 68, the anode of which is connected to the inverting input of the amplifier 63. The anode of the diode 68 is also connected to ground through the parallel connection of an integrating capacitor 69 and discharging resistor 71 and the non-inverting input of an operational amplifier 72. The output of the amplifier 72 is connected to the inverting input thereof in a voltage follower arrangement and also to ground through the resistance element of a potentiometer 73. The slider of the potentiometer 73 is connected to ground through a resistor 74 and also to the non-inverting input of the amplifier 66.

The output of the amplifier 66 is connected to the D input of a flip-flop 76. The clock pulses P are applied to the clock input of the flip-flop 76. The binary data signals D appear at the output of the flip-flop 76 in synchronism with the clock pulses P and are fed to the data input of a RAM 77 of the memory 44.

The amplifier 63, diode 68, capacitor 69 and resistor 71 constitute a peak detector. Thus, the output of the amplifier 72 corresponds to the peak of the signals Vid. This peak signal is voltage divided by the potentiometer 73 and applied to the amplifier 66 as a threshold value VR. The amplifier 66 functions as comparator and produces a high or low output in accordance with whether the data signal Vid have a magnitude higher or lower than the magnitude of the threshold value VR. The value VR is adjustable by means of the potentiometer 73. In this manner, the analog signals Vid are quantized to produce the binary signals D.

When the enable signal L is high, the transistor 61 is turned off and the capacitor 69 discharges through the resistor 71. The output of the amplifier 66 and thereby the threshold value VR go to zero. This has the effect of causing the amplifier 66 to produce a low output regardless of the magnitude of the signals Vid. Thus, a zero output is constantly applied to the data input of the RAM 77 as long as the signal L is high.

The processor 43 further comprises a flip-flop 78 having its D input connected to the output of the NAND gate 33. The clock pulses P are fed to the clock input of the flip-flop 78 and also to the clock input of a flip-flop 79 through an inverter 81. The EOS signal is applied to the D input of the flip-flop 79. The Q output of the flip-flop 78 is connected to the clock input of a flip-flop 82. The D input of the flip-flop 82 is hard-wired to a positive D.C. source +V. The Q output of the flip-flop 79 is connected to an inverting reset input of the flip-flop 82. The $\overline{Q}$ output of the flip-flop 82 is connected to the D input of a flip-flop 83, the clock input of which is connected to receive the clock pulses P.

The blanking signal B appears at the Q output of the flip-flop 83 and is applied to an inverting input of an AND gate 84. The enable signal L is applied to another inverting input of the AND gate 84. The output of the AND gate 84 is connected to an address decoder 86, the output of which is connected to the RAM 77.

The output of the AND gate 84 is also connected to an input of an AND gate 87, the output of which is connected to an input of a line selector 88. The clock pulses P are applied through an inverter 89 to another input of the AND gate 87. The output of the line selector 88 is connected to the RAM 77.

The address decoder 86 is incremented by the blanking pulses B to select successive columns (vertical) in the RAM 77. The line selector 88 is incremented by the clock pulses P to select successive line (horizontal) in the RAM 77. Each line and column value corresponds to a discrete memory location.

Figure 10:
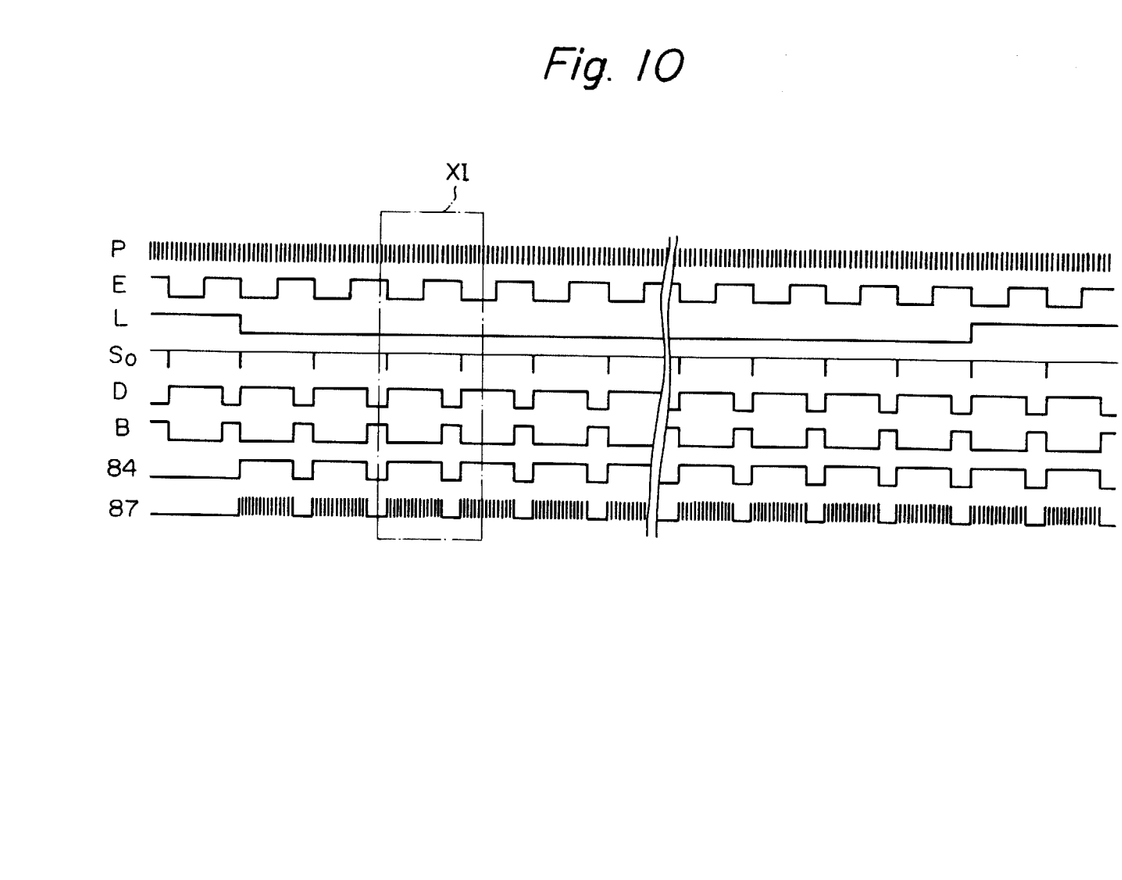
FIG. 10 is a timing diagram illustrating the operation of the circuitry of FIG. 9.

The operation of the circuitry of FIG. 9 will now be described with reference also being made to FIGS. 10 and 11. Outside the effective scan area, the high enable signal L inhibits the AND gate 84 to prevent incrementation of the address decoder 86. The low output of the AND gate 84 inhibits the AND gate 87 and prevents incrementation of the line selector 88. The AND gate 84 is enabled when the array 21 is in the effective scan area by the low enable signal L which allows the address decoder 86 to be incrementated by the inverted blanking signals B. The AND gate 87 is enabled during the times the inverted blanking signals B are high, allowing the line selector 88 to be incremented by the clock pulses P.

Figure 11:
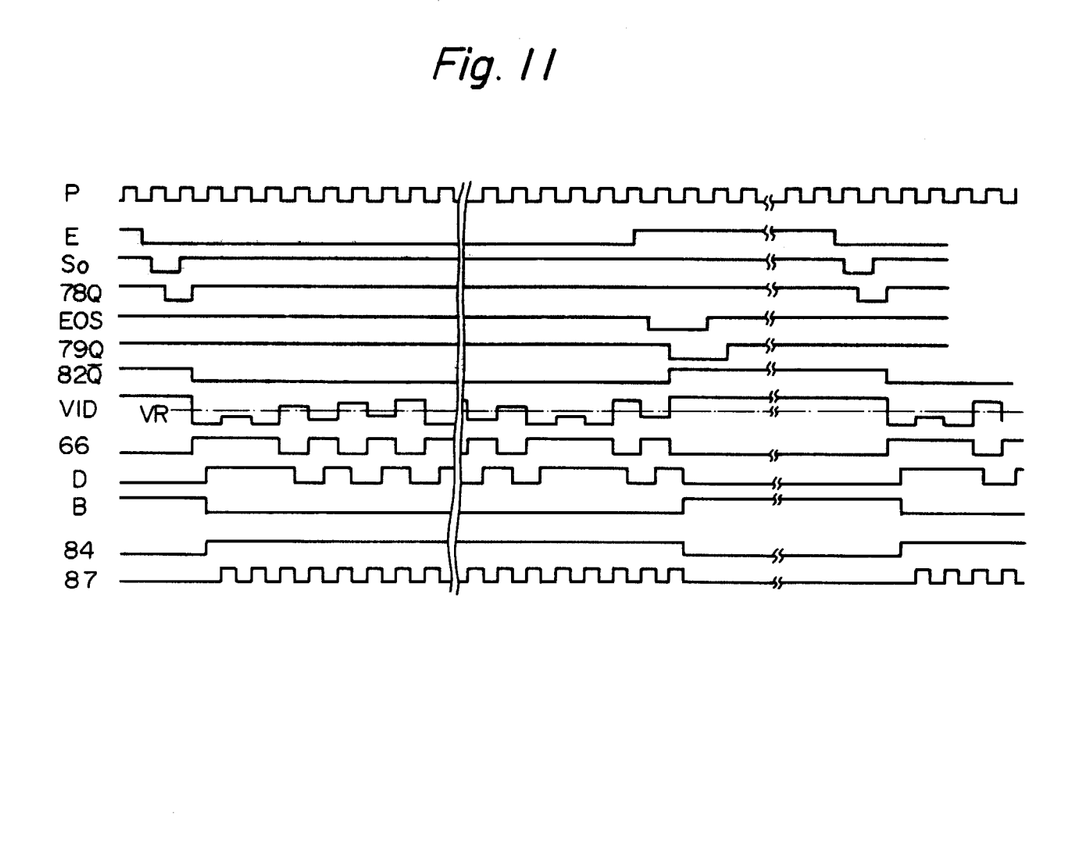
FIG. 11 is an enlarged timing diagram illustrating an area of the diagram of FIG. 10 enclosed by a curve XI.

As clearly illustrated in FIG. 11, when the scan start signal So goes low, the flip-flop 78 is changed to the high state in response to the trailing edge of the next clock pulse P. The Q output of the flip-flop 78 is low for one clock pulse period since the signal So goes high in response to the leading edge of the next clock pulse P and the flip-flop 78 is changed to the high state by the trailing edge of this clock pulse.

When the Q output of the flip-flop 78 goes high, it edge triggers the flip-flop 82 to the high state since the D input of the flip-flop 82 is hard-wired to +V. This causes the $\overline{Q}$ output of the flip-flop 82 to go low, said low output being applied to the D input of the flip-flop 83. Under these conditions, the flip-flop 83 will be changed to the high state in response to the leading edge of the next clock pulse P. The high signal B is inverted by the AND gate 84 to enable the RAM 77 to be incremented for data input.

In response to the EOS signal going low, the flip-flop 79 is changed to the low state at the trailing edge of the next clock pulse P. The falling Q output of the flip-flop 79 resets the flip-flop 82. The $\overline{Q}$ output of the flip-flop 82 goes high and is applied to the D input of the flip-flop 83. The flip-flop 83 is set by the rising edge of the next clock pulse P. The Q output of the flip-flop 83, constituting the blanking signal B, goes high preventing incrementation of the RAM 77. The flip-flop 79 is set by the trailing edge of the next clock pulse generated after the EOS signal goes high.

In summary, it will be seen that the present invention overcomes the drawbacks of the prior art and provides a photoelectric scanning apparatus which operates in a reliable manner using a simple circuit. Various modifications will become possible for those skilled in the art after receiving the teachings of the present disclosure without departing from the scope thereof. For example, the enable signal may be arranged to inhibit incrementation of the RAM 77, transmission of the data signals Vid or the data signals D singly or in any combination outside the effective scan area in accordance with the present invention.

What is claimed is:

1. A photoelectric scanning apparatus including a charge accumulation type photosensor array having a plurality of photosensor elements arranged in a row, the array being reciprocated for scanning perpendicular to the row, characterized by comprising:
   pulse generator means for producing timing pulses in response to incremental movements of the array, the array producing data signals from outputs of all of the elements in response to each timing pulse;
   sensor means for producing an enable signal when the array is within an effective scan area in which periods of timing pulses are constant; and
   gate means for enabling transmission of the data signals only in response to the enable signal.

2. An apparatus as in claim 1, in which the gate means comprises a gate for passing the data signals therethrough only in response to the enable signal.

3. An apparatus as in claim 1, further comprising a clock pulse generator for generating clock pulses, the array producing the data signals in response to respective clock pulses, the gate means comprising a read-write memory having a data input connected to receive the data signals and an address incrementation input, the gate means comprising a gate for passing the clock pulses to the address incrementation input of the memory only in response to the enable signal.

4. An apparatus as in claim 3, further comprising means for reading the data signals out of the memory for transmission.

* * * * *